(12) United States Patent
Yang et al.

(10) Patent No.: US 9,407,141 B2
(45) Date of Patent: Aug. 2, 2016

(54) CONTROL CIRCUIT OF POWER CONVERTER AND METHOD THEREFORE

(71) Applicant: SYSTEM GENERAL CORP., New Taipei (TW)

(72) Inventors: Ta-Yung Yang, Milpitas, CA (US); Hung-Chun Chen, Hsinchu (TW)

(73) Assignee: Fairchild (Taiwan) Corporation, Taipei (TW)

( * ) Notice: Subject to any disclaimer, the term of this patent is extended or adjusted under 35 U.S.C. 154(b) by 188 days.

(21) Appl. No.: 14/453,618

(22) Filed: Aug. 7, 2014

(65) Prior Publication Data
US 2015/0042303 A1 Feb. 12, 2015

Related U.S. Application Data

(60) Provisional application No. 61/863,008, filed on Aug. 7, 2013.

(51) Int. Cl.
*H02M 1/08* (2006.01)
*H02M 3/156* (2006.01)
*H02M 3/335* (2006.01)
*H02M 1/00* (2006.01)

(52) U.S. Cl.
CPC .......... *H02M 3/156* (2013.01); *H02M 3/33523* (2013.01); *H02M 2001/0032* (2013.01); *Y02B 70/16* (2013.01)

(58) Field of Classification Search
CPC   H02M 1/08; H02M 3/33507; H02M 3/33546
USPC ............ 363/21.01, 21.08, 21.1, 21.16, 21.18, 363/97
See application file for complete search history.

(56) References Cited

U.S. PATENT DOCUMENTS

| | | | |
|---|---|---|---|
| 2012/0170329 A1 | 7/2012 | Matthews | |
| 2015/0042303 A1* | 2/2015 | Yang | H02M 3/156 323/282 |
| 2015/0062981 A1* | 3/2015 | Fang | H02M 3/33507 363/21.17 |

FOREIGN PATENT DOCUMENTS

| | | |
|---|---|---|
| CN | 103219887 | 7/2013 |
| TW | I251978 | 3/2006 |

OTHER PUBLICATIONS

"Office Action of Taiwan Counterpart Application", issued on Aug. 25, 2015, p. 1-p. 6.

* cited by examiner

*Primary Examiner* — Jeffrey Sterrett
(74) *Attorney, Agent, or Firm* — Jianq Chyun IP Office

(57) ABSTRACT

A control circuit of a power converter and a method therefore are provided. The control circuit comprises an input circuit, an amplifier, a PWM circuit, and a power management circuit. The input circuit is coupled to a transformer to generate a sensing signal related to an output voltage of the power converter. The amplifier generates a feedback signal according to the sensing signal and a reference signal. The PWM circuit generates a switching signal according to the feedback signal for switching the transformer and regulating the output voltage of the power converter. The power management circuit controls the reference signal according to the feedback signal. The power management circuit includes a timer for determining a period, and the output voltage of the power converter decreases while an output power of the power converter is lower than a light-load threshold. A method for controlling the control circuit is also disclosed.

12 Claims, 4 Drawing Sheets

CONTROL CIRCUIT OF POWER CONVERTER AND METHOD THEREFORE

CROSS-REFERENCE TO RELATED APPLICATION

This application claims the priority benefits of U.S. provisional application Ser. No. 61/863,008, filed on Aug. 7, 2013. The entirety of the above-mentioned patent application is hereby incorporated by reference herein and made a part of this specification.

BACKGROUND OF THE INVENTION

1. Field of the Invention

The present invention relates to a control technology for a power converter, and more particularly relates to a method and a control circuit for a primary-side regulation power converter to save the power during the light load operation.

2. Related Art

Various power converters have been widely used to provide regulated voltage and current. For the sake of safety reasons, an off-line power converter must provide galvanic isolation between its primary side and secondary side. The object of the present invention is to program and reduce the output voltage of the power converter at the light load and no load conditions.

The object of the present invention is to provide a control module for controlling the output voltage and the output current of the power converter at the primary side without the need of the opto-coupler and secondary-side regulator. Therefore, the size and the cost of the power converter can be reduced.

SUMMARY OF THE INVENTION

The present invention provides a control circuit of a power converter, including an input circuit, an amplifier, a PWM circuit, and a power management circuit. The input circuit is coupled to a transformer to generate a sensing signal related to an output voltage of the power converter. The amplifier generates a feedback signal according to the sensing signal and a reference signal. The PWM circuit generates a switching signal according to the feedback signal for switching the transformer and regulating the output voltage of the power converter. The power management circuit controls the reference signal according to the feedback signal. The power management circuit includes a timer for determining a period, and the output voltage of the power converter decreases while an output power of the power converter is lower than a light-load threshold during the period.

From another point of view, the present invention further provides a method for controlling a power converter. The method includes following steps: generating a feedback signal through sampling a reflected voltage of a transformer; generating a switching signal according to the feedback signal for switching the transformer and regulating an output voltage of the power converter; reducing the output voltage of the power converter under a light load condition of the power converter during a period.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DETAILED DESCRIPTION OF EMBODIMENTS

Figure 1:
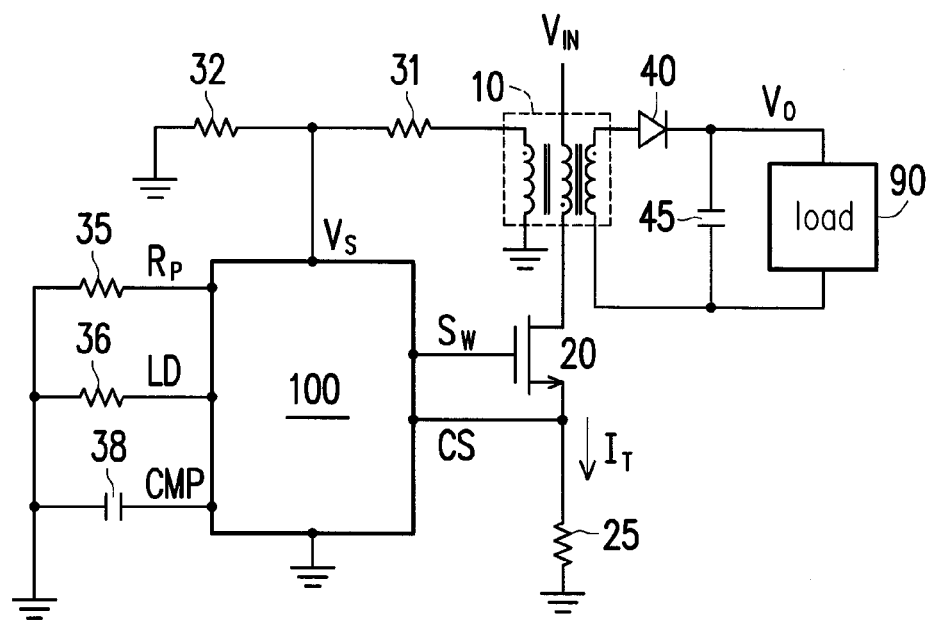
FIG. 1 shows a block diagram illustrating an adaptive power converter according to one embodiment of the present invention.

FIG. 1 shows a block diagram illustrating an adaptive power converter according to one embodiment of the present invention. An isolated flyback power converter is shown according to the present embodiment of the invention, which includes a transformer 10, a transistor 20, a load 90, a control circuit 100, resistors 25, 31, 32, 35, and 36, capacitances 38 and 45 and a rectifier 40. The transformer 10 is connected to an input voltage $V_{IN}$ of the power converter. The transformer 10 includes a primary winding $N_P$, an auxiliary winding $N_A$ and a secondary winding $N_S$. The transistor 20 is configured to switch a primary winding $N_P$ of the transformer 10. The control circuit 100 generates a switching signal $S_W$ configured to drive the transistor 20 for regulating an output voltage $V_O$ of the power converter. When the transistor 20 is turned on, the transformer current $I_T$ will generate a sensing current signal CS via a resistor 25. The sensing current signal CS is coupled to the control circuit 100. The resistors 31 and 32 are coupled to the auxiliary winding $N_A$ of the transformer 10 for detecting and generating a reflected signal $V_S$, and the reflected signal $V_S$ is connected to the control circuit 100. The reflected signal $V_S$ represents a reflected voltage of the transformer 10. The level of the reflected signal $V_S$ is related the level of the output $V_O$ during the demagnetizing period of the transformer 10. Therefore, a feedback voltage VKO is further produced according to the reflected signal $V_S$ for generating the switching signal $S_W$. The feedback voltage VKO is correlated to the output voltage $V_O$ of the power converter.

A secondary winding $N_S$ of the transformer 10 will generate the output $V_O$ through the rectifier 40 and the capacitor 45. The load 90 is connected to the output $V_O$. The control circuit 100 regulates the output voltage VO as the equation (1).

$$V_O = \frac{N_S}{N_A} \times \frac{R_{31} + R_{32}}{R_{32}} \times V_S \tag{1}$$

The parameters $R_{31}$ and $R_{32}$ are resistances of the resistors 31 and 32 respectively. The voltage of the signal $V_S$ is related the level of the output $V_O$ during the demagnetizing period of the transformer 10.

The capacitor 38 is connected to a feedback signal CMP of the control circuit 100 for the feedback loop compensation.

The control circuit 100 generates the feedback signal CMP by sampling the reflected voltage $V_S$ of the transformer 10. The capacitance of the capacitor 38 will determine the bandwidth of the feedback loop for the regulation of the output $V_O$. The level of the feedback signal CMP is proportional to the level of the output power of the power converter. When the control circuit 100 detects a light load (i.e., a load 90) at the output $V_O$ of the power converter over a period, the control circuit 100 could decrease the output voltage $V_O$ for saving power. The first resistor 36 generates a threshold signal LD for generating and determining a light-load threshold. The second resistor 35 adjusts, programs and generates a reference signal $R_P$ applied to determine the output voltage $V_O$ under the light load condition. Therefore, if the output power of the power converter is operated lower than the light-load threshold, the output voltage $V_O$ will be decreased according to the level of the signal $R_P$.

Figure 2:
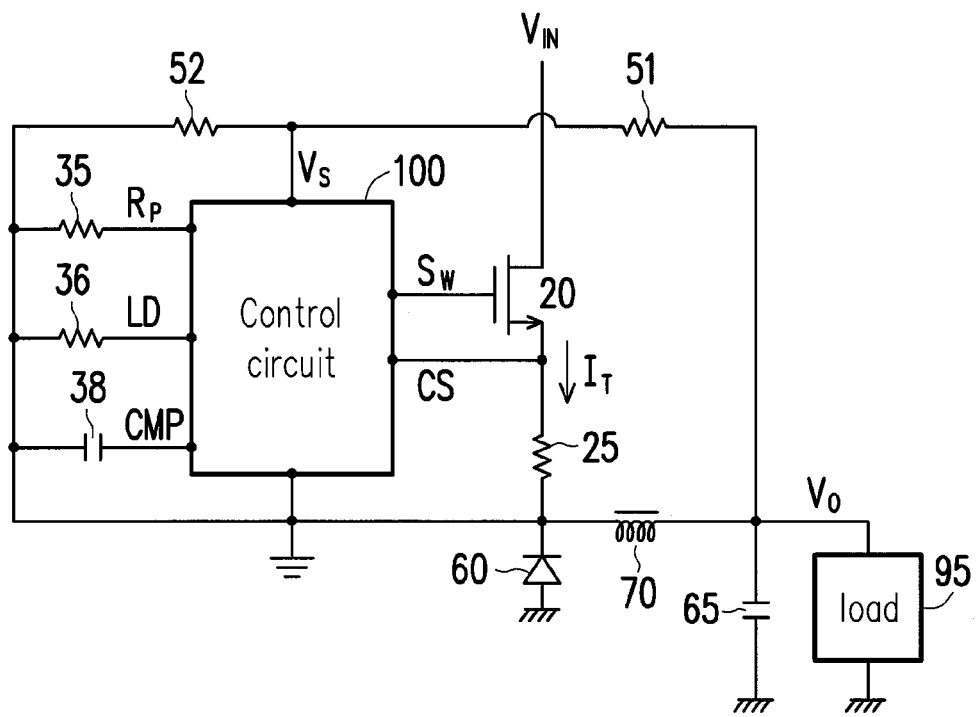
FIG. 2 shows a block diagram illustrating an adaptive power converter according to another embodiment of the present invention.

FIG. 2 shows a block diagram illustrating an adaptive power converter according to another embodiment of the present invention. It is a non-isolated high voltage buck converter in the present embodiment of the invention, which includes a transistor 20, a load 95, a control circuit 100, resistors 35, 36, 51, and 52, capacitances 38 and 65, an inductor 70 and a rectifier 60. The techniques of the control circuit 100 of the non-isolated high voltage buck converter are similar as the isolated flyback power converter described in FIG. 1.

Figure 3:
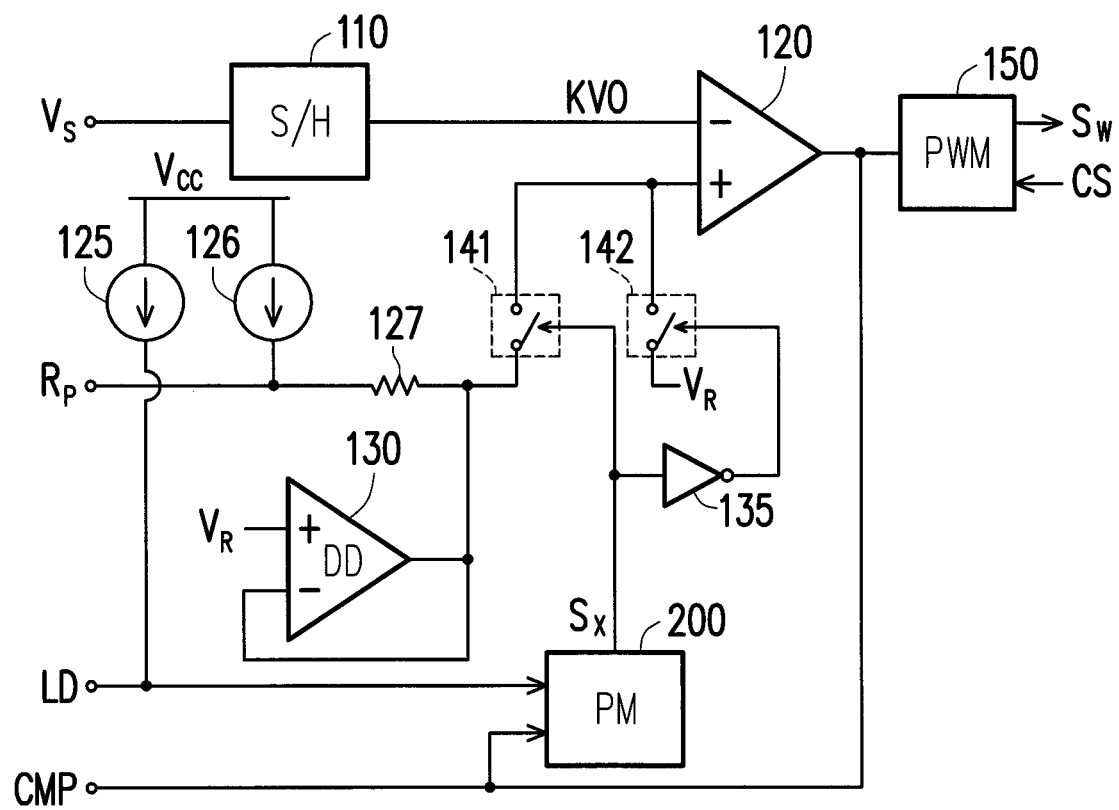
FIG. 3 shows a block diagram illustrating the control circuit of the adaptive power converters in FIG. 1 and FIG. 2 according to embodiments of the present invention.

FIG. 3 shows a block diagram illustrating the control circuit 100 of the adaptive power converters in FIG. 1 and FIG. 2 according to embodiments of the present invention. The control circuit 100 includes an input circuit, an error amplifier 120, current sources 125 and 126, an open-drain buffer 130, an inverter 135, switches 141 and 142, a resistor 127, and a power management circuit 200. The input circuit is coupled to a transformer to generate a sensing signal related to the output voltage $V_O$ of the power converter. The input circuit includes a sample-and-hold circuit (S/H) 110. The sample-and-hold circuit (S/H) 110 is configured to receive and sample the reflected signal $V_S$ of the transformer and then generate the feedback voltage KVO. The feedback voltage KVO is related to the voltage of the output $V_O$.

The feedback voltage KVO is coupled to the error amplifier 120 for generating the feedback signal CMP according to the sensing signal (i.e., the feedback voltage KVO) and a reference signal $V_R$. The PWM circuit (PWM) 150 receives the feedback signal CMP to generate the switching signal $S_W$ according to the feedback signal CMP. In other words, the control circuit 100 generates the switching signal $S_W$ according to the feedback signal CMP for switching the transformer 10 and regulating the output voltage $V_O$ of the power converter. A higher level of the feedback signal CMP will generate a wider pulse width of the switching signal $S_W$. The power management circuit 200 controls the reference signal $V_R$ according to the feedback signal CMP. The feedback signal CMP is further coupled to a power management (PM) circuit 200 for generating a control signal $S_X$. The control signal $S_X$ will be enabled when the level of the feedback signal CMP is lower than the level of the threshold signal LD. The current source 125 associated with the resistor 36 generates the threshold signal LD. The current source 126 associated with the resistor 35 generates the signal R. The maximum value of the signal $R_P$ is clamped by the reference signal $V_R$ through the open-drain buffer 130. The control signal $S_X$ is applied to control switches 141 and 142. When the control signal $S_X$ is disabled under the high load conditions, the switch 141 is turned off and the switch 142 is turned on, and the reference signal $V_R$ is coupled to the error amplifier 120. The output voltage $V_O$ can be expressed as the equation (2).

$$V_O = \frac{N_S}{N_A} \times \frac{R_{31} + R_{32}}{R_{32}} \times V_R \qquad (2)$$

When the control signal $S_X$ is enabled under the light load condition (i.e., the level of feedback signal CMP is lower than the light-load threshold), the switch 142 is turned off and the switch 141 is turned on, and the signal $R_P$ will be coupled to the error amplifier 120 to determine the output voltage $V_O$ as the equation (3).

$$V_O = \frac{N_S}{N_A} \times \frac{R_{31} + R_{32}}{R_{32}} \times V_{RP} \qquad (3)$$

The parameter $V_{RP}$ is the level of the signal $R_P$.

Figure 4:
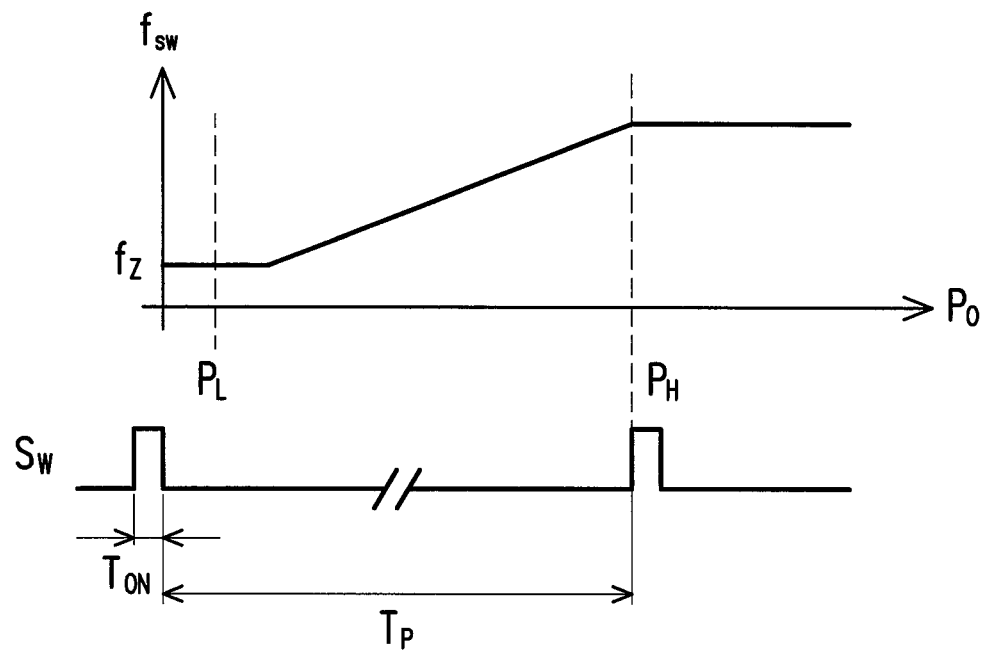
FIG. 4 shows the waveforms of the switching signal generated by the PWM circuit according to one embodiment of the present invention.

FIG. 4 shows the waveforms of the switching signal $S_W$ generated by the PWM circuit 150 according to one embodiment of the present invention. The PWM circuit 150 will decrease the switching frequency $f_{SW}$ of the switching signal $S_W$ while the output power $P_O$ is lower than a threshold $P_H$ during a period. When the output power $P_O$ is lower than the light-load threshold $P_L$, the output voltage $V_O$ will be decreased according to the level of the signal $R_P$ (shown in equation (3)). Under the light-load or no load conditions, the switching signal $S_W$ has a minimum on-time $T_{ON}$ and a minimum switching frequency $f_Z$ to maintain the primary side regulation power converter work properly. A maximum period $T_P$ is required, where $T_P = 1/f_Z$.

Figure 5:
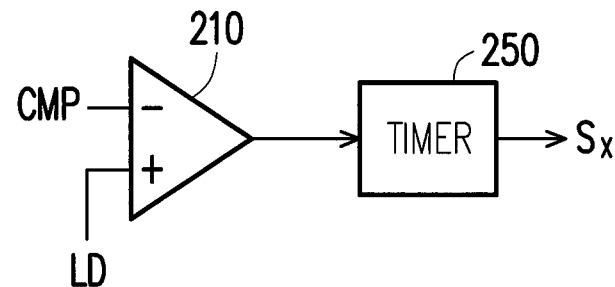
FIG. 5 shows a block diagram illustrating the power management circuit of the adaptive power converter according to one embodiment of the present invention.

FIG. 5 shows a block diagram illustrating the power management circuit 200 of the adaptive power converter according to one embodiment of the present invention. The power management circuit 200 includes a comparator 210 and a counter(TIMER) 250 for determining the period $T_P$. The period $T_P$ is determined through the counter 250. The comparator 210 generates a light-load signal while the feedback signal CMP is lower than the level of the threshold signal LD. The light-load signal is configured to enable the counter 250 and generate the control signal $S_X$ while the counter 250 is expired.

Figure 6:
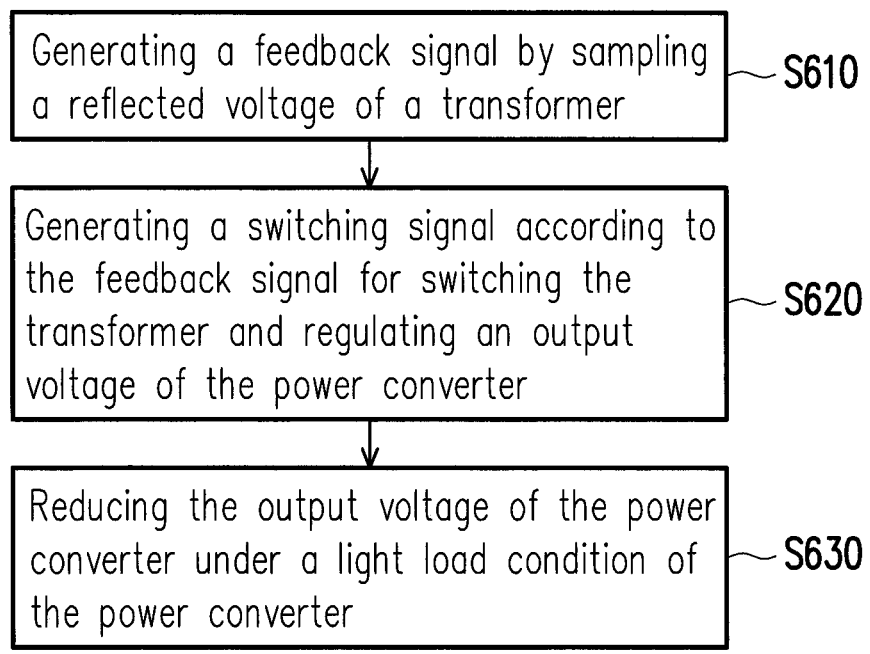
FIG. 6 shows a flowchart illustrating a method for controlling the power converter according to one embodiment of the present invention.

FIG. 6 shows a flowchart illustrating a method for controlling the power converter according to one embodiment of the present invention. In the present embodiment, the method is applicable to the control circuit 100 of the power converter of FIG. 1 and FIG. 2. In step S610, the control circuit 100 generates the feedback signal CMP by sampling the reflected voltage $V_S$ of the transformer 10. In step S620, the control circuit 100 generates the switching signal $S_W$ according to the feedback signal CMP for switching the transformer 10 and regulating the output voltage $V_O$ of the power converter. In step S630, the control circuit 100 reduces the output voltage $V_O$ of the power converter under a light load condition of the power converter. The output voltage $V_O$ of power converter will be reduced while the power converter is operated in the light load condition during a period $T_P$. The techniques combined with detailed actuation of the control circuit of the power converter are already described in the above embodiments of the present invention.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A control circuit of a power converter, including:
    an input circuit (110) coupled to a transformer to generate a sensing signal (KVO) related to output voltage of the power converter;
    an amplifier (120) for generating a feedback signal according to the sensing signal (KVO) and a reference signal;
    a PWM circuit (150) for generating a switching signal according to the feedback signal for switching the transformer and regulating the output voltage of the power converter; and
    a power management circuit (200) for controlling the reference signal according to the feedback signal,
    wherein the power management circuit (200) includes a timer for determining a period; the output voltage of the power converter decreases while output power of the power converter is lower than a light-load threshold during the period.

2. The control circuit as claimed in claim 1, in which the switching signal has a minimum switching frequency and a minimum on-time.

3. The control circuit as claimed in claim 1, in which the input circuit (110) includes:
    a sample-and-hold circuit for sampling a reflected voltage of the transformer.

4. The control circuit as claimed in claim 1, further including:
    a first resistor for programming the light-load threshold.

5. The control circuit as claimed in claim 1, further including:
    a second resistor for programming the reference signal for determining the output voltage of the power converter under a light load condition.

6. The control circuit as claimed in claim 1, further including:
    a capacitor for a feedback loop compensation.

7. A method for controlling a power converter, including:
    generating a feedback signal by sampling a reflected voltage of a transformer;
    generating a switching signal according to the feedback signal for switching the transformer and regulating an output voltage of the power converter; and
    reducing the output voltage of the power converter under a light load condition of the power converter during a period.

8. The method as claimed in claim 7, further including:
    generating a light-load threshold, and
    the step of generating a light-load threshold includes:
    generating a threshold value on a first resistor.

9. The method as claimed in claim 7, further including:
    determining the output voltage of the power converter under the light load condition through adjusting a reference signal by a second resistor.

10. The method as claimed in claim 7, further including:
    determining the period through a counter.

11. The method as claimed in claim 7, in which the switching signal has a minimum switching frequency and a minimum on-time.

12. The method as claimed in claim 7, in which the power converter is a primary-side regulation power converter.

* * * * *